US008257819B2

(12) United States Patent
Tompkin et al.

(10) Patent No.: US 8,257,819 B2
(45) Date of Patent: Sep. 4, 2012

(54) SECURITY ELEMENT FOR SAFEGUARDING VALUE-BEARING DOCUMENTS

(75) Inventors: Wayne Robert Tompkin, Baden (CH); Andreas Schilling, Hagendorn (CH); Achim Hansen, Zug (CH)

(73) Assignee: OVD Kinegram AG, Zug (CH)

( * ) Notice: Subject to any disclaimer, the term of this patent is extended or adjusted under 35 U.S.C. 154(b) by 990 days.

(21) Appl. No.: 12/021,669

(22) Filed: Jan. 29, 2008

(65) Prior Publication Data

US 2008/0182084 A1 Jul. 31, 2008

(30) Foreign Application Priority Data

Jan. 30, 2007 (DE) ........................ 10 2007 005 414

(51) Int. Cl.

| | |
|---|---|
| ***B41M 5/10*** | (2006.01) |
| ***B44C 1/17*** | (2006.01) |
| ***B32B 3/00*** | (2006.01) |
| ***G02B 1/10*** | (2006.01) |
| ***G02B 27/10*** | (2006.01) |
| ***B42D 15/10*** | (2006.01) |

(52) U.S. Cl. ..................... 428/195.1; 428/199; 428/201; 428/203; 359/585; 359/619; 283/72

(58) Field of Classification Search .................. 428/146, 428/195.1–211.1, 199–209; 359/585, 619; 283/85, 91

See application file for complete search history.

(56) References Cited

U.S. PATENT DOCUMENTS

| | | | | |
|---|---|---|---|---|
| 4,849,265 | A | 7/1989 | Ueda et al. | |
| 5,731,064 | A | 3/1998 | Suss | |
| 8,027,093 | B2 * | 9/2011 | Commander et al. | 359/619 |
| 2008/0106091 | A1 * | 5/2008 | Tompkin et al. | 283/91 |
| 2008/0231976 | A1 * | 9/2008 | Commander et al. | 359/833 |
| 2009/0034082 | A1 * | 2/2009 | Commander et al. | 359/619 |

FOREIGN PATENT DOCUMENTS

| | | |
|---|---|---|
| CA | 2580288 | 3/2006 |
| DE | 10251781 | 5/2004 |
| WO | WO 01/39138 | 5/2001 |
| WO | WO2004041546 | 5/2004 |
| WO | WO 2005/121450 | 12/2005 |
| WO | WO 2006/029745 | 3/2006 |
| WO | WO2006029745 | 3/2006 |
| WO | WO 2006/095161 | 9/2006 |

* cited by examiner

*Primary Examiner* — Mark Ruthkosky
*Assistant Examiner* — Laura C Dettinger
(74) *Attorney, Agent, or Firm* — Hoffmann & Baron, LLP

(57) ABSTRACT

The invention concerns a security element (1) and a value-bearing document safeguarded by such a security element. The security element (1) includes a strip-form multi-layer body (10) with a carrier film (11) and at least one decorative layer (12), as well as a first and a second adhesive layer (14, 15). The first adhesive layer (14) is provided on a first surface of the multi-layer body (10). The second adhesive layer (15) is provided on an opposite second surface of the multi-layer body. The security element has two or more first regions (21) in which the first adhesive layer (14) respectively covers the first surface of the multi-layer body and two or more second regions (22) in which the second but not the first surface of the multi-layer body is respectively covered by the second and the first adhesive layer respectively and in which a surface structure is respectively formed in the first surface. First and second regions (21, 22) are in this case arranged in mutually juxtaposed adjacent relationship.

31 Claims, 6 Drawing Sheets

SECURITY ELEMENT FOR SAFEGUARDING VALUE-BEARING DOCUMENTS

This application claims priority based on German Application No. 102007005414.0, filed on Jan. 30, 2007, the specification of which is incorporated herein by reference in its entirety for all purposes.

BACKGROUND OF THE INVENTION

The invention concerns a security element for safeguarding value-bearing documents, for example for safeguarding banknotes, passports, visas, admission tickets or securities and bonds, as well as a value-bearing document with such a security element.

Security elements are usually fixed on the carrier body of a value-bearing document by means of a hot melt adhesive layer. Thus for example WO 2006/029745 A1 describes a security document having a security feature applied to the carrier body by means of a transfer film. In that arrangement, the surface of that security feature, that is remote from the carrier body, has a microlens array. The oppositely disposed surface is provided with an adhesive layer by means of which the security element is applied to the carrier body.

It is also known for security elements in the form of security threads to be introduced into the carrier body of the value-bearing document during production of the paper. In that case the security thread is enclosed by the paper fiber weave and thereby fixed in the carrier body.

SUMMARY OF THE INVENTION

Now, the object of the invention is to improve the forgery-resistant nature of value-bearing documents.

That object is attained by a security element for safeguarding value-bearing documents, wherein the security element includes a strip-form multi-layer body with a carrier film and at least one decorative layer as well as a first and a second adhesive layer, wherein the first adhesive layer is provided on a first surface of the multi-layer body and the second adhesive layer is provided on an oppositely disposed second surface of the multi-layer body, wherein the security element has two or more first regions in which the first adhesive layer respectively covers the first surface of the multi-layer body and two or more second regions in which the second but not the first surface of the multi-layer body is respectively covered by the second and the first adhesive layer respectively and in which a surface structure is respectively shaped in the first surface, and wherein first and second regions of the first and second regions are alternately arranged in adjacent mutually juxtaposed relationship.

The object of the invention is further attained by a value-bearing document in which the carrier body of the value-bearing document is joined to the multi-layer body of such a security element by means of the first and second adhesive layers.

Test investigations have shown that the alternate arrangement of the adhesive layers and the regions which are not covered with an adhesive layer with the surface structures which act against air, such as microlens structures or microprism structures, on the one hand provide for extremely durable and strong binding of the security element into the value-bearing document and in addition that binding-in effect by the interaction with the security feature afforded by the surface structures (the optical effect for example of the microlenses would be extinguished by the adhesive layer) provides that imitation of that security feature is made considerably more difficult. Thus the intensive double-sided adhesive connection of the security element to the carrier body of the value-bearing document effectively prevents the security element from being separated out of the carrier body without destroying the security element. Furthermore the long-term resistance of the value-bearing document in relation to mechanical influences is improved and thus for example the service life of banknotes is increased. Furthermore the double-sided provision of an adhesive layer in conjunction with the surface structures which act against air has on the one hand a direct influence on the optical effect and/or the tactile effect by the adhesive layer and thus sets high demands in terms of the production process. Thus for example register inaccuracies when applying the first adhesive layer have effects on the optical imaging function afforded by the microlenses and production, handling and introduction of the multi-layer body which is provided with an adhesive layer on both sides places high technological demands on the production process, whereby the forgery-resistant nature of the security feature afforded by the security element is further enhanced.

The above-specified object is further also attained by a security element for safeguarding value-bearing papers, wherein the security element has a strip-form multi-layer body with a carrier film and at least one decorative layer as well as a first and a second adhesive layer, wherein the first adhesive layer is provided on a first surface of the multi-layer body and the second adhesive layer is provided on an oppositely disposed second surface of the multi-layer body, wherein a surface structure with a plurality of structure elements is shaped in the first surface in a replication lacquer layer and wherein at least in a region of the security element the first adhesive layer is applied to the surface structure in a layer thickness of less than 50% of the structure depth of the structure elements of the surface structure.

Advantageous developments of the invention are set forth in the appendant claims.

Binding of the security element into the carrier body of the value-bearing document can be further improved if in the two or more first regions the second adhesive layer respectively covers the surface of the multi-layer body. It is thus possible for example for the second adhesive layer to cover the second surface of the multi-layer body over the full area thereof.

The multi-layer body is preferably a strip-form multi-layer body of a width of between 1 mm and 20 mm. In that case the first and second regions are preferably arranged alternately in the longitudinal direction of the strip-form multi-layer body, thereby affording a particularly strong connection between the carrier body and the security element.

In accordance with a preferred embodiment of the invention first and second regions are periodically repeated in a regular, one-dimensional or two-dimensional raster grid pattern. The first regions and/or the second regions are in that case of substantially equal dimensions, thereby affording a repetitive appearance. The first regions are thus for example always of the same constant length with respect to the longitudinal direction of the multi-layer body and occupy the overall width of the multi-layer body. It is further advantageous here if the length of the first regions is between 10% and 50% of the length of the second regions.

In this case the security element is preferably introduced into the carrier body of the value-bearing document in such a way that, in two or more third regions of the security element, the first surface of the multi-layer body is covered by the carrier body, and in two or more fourth regions of the security element the second surface of the multi-layer body but not the first surface thereof is covered by the carrier body. In that arrangement each of the third regions is disposed in overlapping relationship with at least one of the first regions so that the multi-layer body is fixedly connected to the carrier body in each of the third regions by means of the first adhesive layer.

It is possible in that case for the third and first regions and the fourth and second regions to be arranged in register relationship with each other whereby the forgery-resistant nature of the value-bearing document is further enhanced: it is thus necessary for the security element to be inserted into the value-bearing document in accurate register relationship.

In accordance with a further embodiment of the invention the first and second regions are arranged in a periodic first succession and the third and fourth regions are arranged in a periodic second succession. The period of the first succession is selected in that case to be less than the period of the second succession, preferably being selected to be less than half the first period. That achieves the advantage that it is possible to achieve an adhesive connection for the first surface of the multi-layer body in each of the third regions even without registered application of the security element and it is thus possible to effect detachment of the security element from the carrier body of the value-bearing document even without registered application of the security element and thus at a lower level of complication and expenditure in terms of production technology.

Furthermore it is possible for the succession of the third and fourth regions not to be periodic. Preferably in that case the minimum spacing between two successive first regions is greater than that between two successive third regions.

Further optical effects which are of interest can be achieved if the first and second regions are arranged in accordance with a first one-dimensional or two-dimensional raster grid pattern and the third and fourth regions are arranged in accordance with a second one-dimensional or two-dimensional raster grid pattern. With a differing period in respect of the grid patterns and/or in the case of a phase shift of regions of those grid patterns, interesting moiré effects which make forgery immediately detectable are afforded upon incorporation of the security element.

In accordance with a first embodiment of the invention the second regions are respectively of a smallest dimension of more than 300 μm and thus optically appear as repetitive individual elements. In this embodiment the first regions are preferably of an extent in the longitudinal direction of the strip-form multi-layer body of between 0.5 mm and 5 mm and the second regions are of an extent in the longitudinal direction of the strip-form multi-layer body of between 2 mm and 15 mm. Tests have shown that this makes it possible to achieve a join between the security element and the carrier body of the value-bearing document, that enjoys particular long-term stability.

In accordance with a further embodiment of the invention the first regions are of a smallest dimension of less than 300 μm. The first regions are thus for example shaped in strip form of a width of less than 300 μm and are of a largest dimension of more than 300 μm and a smallest dimension of less than 300 μm. With such sizing, the first regions, at a normal viewing distance for the human eye, are no longer resolved in the form of individual elements, whereby attractive optical effects can be achieved.

A plurality of structure elements involving a structure depth of between 200 μm and 100 nm and a structure width of between 5 μm and 500 μm are shaped in the first surface, as the surface structure. The surface structure is preferably a non-random, mathematically describable structure which is repetitively composed of substantially similar structure elements.

In accordance with a preferred embodiment a plurality of microlenses are shaped as surface structures in the first surface, wherein preferably one or more of those microlenses are respectively provided in the second regions.

The microlenses are preferably shaped in the form of spherical lenses. They can however also be shaped in the form of cylindrical lenses. In that case the microlenses are preferably of a diameter of between 5 μm and 500 μm, in particular between 10 μm and 50 μm. Furthermore in the second regions the decorative layer respectively has one or more microimages which are preferably arranged within the micro-layer body spaced approximately at the spacing of the focal length of the microlenses from the microlenses. Now, partial regions of the microimages are enlarged by the microlenses, thereby affording an integrative image which is dependent on the viewing angle and which represents an optically variable security feature.

In addition it is also possible for microlenses and microimages in accordance with WO 01/39138 A1 to be used.

In accordance with a preferred embodiment of the invention the microimages and microlenses in the second regions are arranged in accordance with a regular microlens grid pattern or microimage grid pattern respectively, wherein the raster grid spacings of the microimage grid and the microlens grid differ from each other by less than 10%. In addition the microimages are identical microimages so that an enlarged, optically variable representation of the microimages is generated in the second regions.

In addition it is also possible for the microlenses not to cover all second regions of the surface over the full area but for the microlenses, for example a microlens raster grid, to be provided in a pattern region which extends over a plurality of second regions, for example in a T-shape. In that respect it is possible that the optical effect afforded by the microlenses can be perceived only in that pattern region so that this affords an additional optical security feature. Furthermore it is also possible that the lenses function as a tactile security feature and impart to the security element, in the pattern region, an item of information which differs from the surrounding region and which can be detected by the human user by tactile means.

Further advantages are afforded if the decorative layer is of a different configuration in the first and second regions. Thus for example the decorative layer respectively has one or more microimages in the second regions and respectively has an optically variable element in the first regions, for example a surface relief having an optical-diffraction effect such as for example a KINEGRAM®, a thin film layer system, an oriented liquid crystal layer, a layer having a volume hologram and/or a layer with optically variable pigments or a combination thereof. To form the microimages, one or more layers of the decorative layers are structured in pattern form in the form of a plurality of microimages, at least in the second regions. Thus in the second regions the decorative layer has for example a structured lacquer layer or a photolacquer layer or also a metal layer which is structured in pattern form. In addition it is also possible for one of the above-described optically variable elements which is structured in the form of one or more microimages to be provided in the second regions.

Furthermore it is also possible for the first regions to co-operate optically to form a first security feature and for the second regions to co-operate optically to form a second security feature which is different therefrom.

Preferably, a regular arrangement comprising a plurality of microscopic structure elements is shaped in the first surface, as the surface structure. The structure elements preferably involve a structure width in the range of between 5 μm and 500 μm and a structure height of between 0.1 μm and 200 μm, in particular between 2 μm and 50 μm. In that case the structure elements of the arrangement are preferably of a substantially similar form. Besides the use of microlenses as structure elements, as explained hereinbefore, it is possible for in particular polyhedrons, for example microprisms, to be shaped in the first surface as structure elements. In that respect, preferably one or more of the polyhedrons are respectively shaped in the second regions. When using microprisms or other polyhedrons, similar optical effects are afforded like those which have already been described hereinbefore for microlenses: a preferably periodic raster grid of micropolyhedrons is superposed with a microimage raster pattern. In that case the micropolyhedrons comprise for example microprisms of a structure height of between 10 and 20 μm arranged at a raster grid spacing of between 10 and 20 μm in a one-dimensional or two-dimensional raster grid. In the more general case the polyhedrons comprise a number of mutually adjoining facet surfaces which in at least one direction respectively assume an angle with respect to the surface normal, that increases in relation to the preceding facet surface, and which thus for example approximate to a cylindrical lens comprising a number of between 3 and 9 facet surfaces. Associated with each of the facet surfaces of the micropolyhedron is a microimage or a partial region of a microimage in the microimage raster grid, thereby affording a corresponding integral image for the human viewer.

Furthermore it is also possible for one or more structure elements which can be detected by tactile means to be respectively shaped in the first surface as surface structures in the second regions. Such structure elements which can be detected by tactile means are distinguished in that they involve a relatively great structure height, for example a height of between 10 and 20 μm, with a spacing of the structure elements of between 10 μm and 100 μm.

In addition it is possible to provide a light-absorbent surface structure as the surface structures, for example a cross grating provided with a metal layer, with periods below the wavelength of the light visible to the human viewer is shaped in the first surface. Such a grating has for example a spatial frequency of between 10,000 l/mm and 2,500 l/mm and involves a structure depth of between 50 nm and 2 μm. By virtue of the application of a usual adhesive layer to a surface structure of that kind, the light-absorbent properties thereof are eliminated and become conspicuous to the human viewer by virtue of the higher degree of light reflection in those regions.

Furthermore it is also possible for a matt structure or a diffractive structure, for example a diffraction grating or a hologram, to be shaped in the first surface as the surface structure. In this case also, in the region in which an adhesive layer is applied to the first surface of the security element, the optical effect generated by those surface structures is suppressed and thus the corresponding regions are rendered visible to the human viewer.

In accordance with a further embodiment of the invention it is provided that the first adhesive layer is respectively provided in a region, surrounding a local maximum of the structure height, of each one of two or more of the structure elements, wherein those regions form the first regions in which the first adhesive layer is provided and the first adhesive layer is not provided in the regions surrounding those regions so that those regions form the second regions. By way of example there is thus provided a microlens array, in which case the first adhesive layer is respectively provided only in a small region around the respective optical axis of the microlenses. Preferably the region of the structure elements in which the first adhesive layer is applied to the structure element respectively occupies less than 50% of the total area occupied by the respective structure element. Surprisingly it has been found that, with such an accurately registered arrangement of regions of the first adhesive layer and the structure elements, the optical and/or tactile effects afforded by the structure elements are only slightly suppressed. Accordingly the optical effect of the surface structure is maintained in spite of the possibility of unregistered secure anchorage of the security element in a value-bearing document.

BRIEF DESCRIPTION OF THE DRAWINGS

The invention is described by way of example hereinafter by means of a number of embodiments with reference to the accompanying drawings in which.

DETAILED DESCRIPTION OF THE INVENTION

Figure 1:
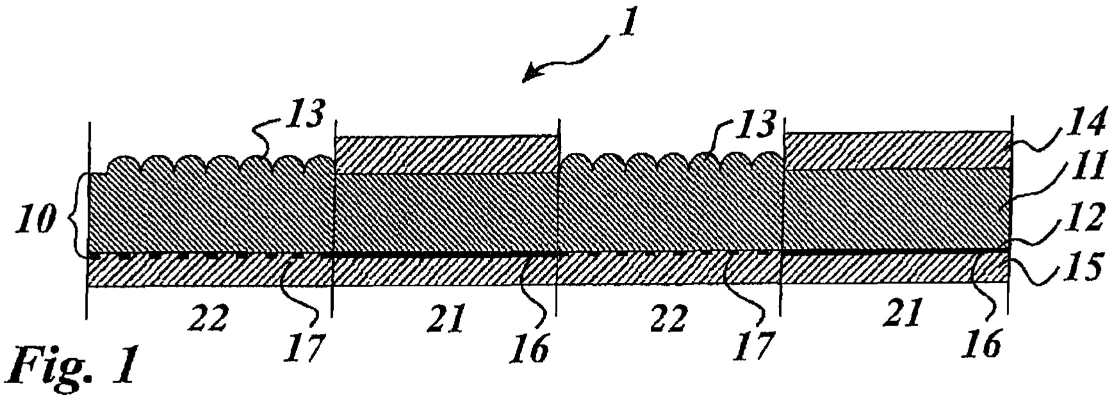
FIG. 1 shows a view in section of a security element according to the invention.

FIG. 1 shows a security element 1 comprising a multi-layer body 10, a first adhesive layer 14 and a second adhesive layer 15. As shown in FIG. 1 the first adhesive layer 14 is provided partially on a first surface of the multi-layer body 10 and the adhesive layer 15 is provided on an oppositely disposed second surface of the multi-layer body 10. The multi-layer body 10 comprises a carrier film 11 and a decorative layer 12 which is preferably a multi-layer system.

The carrier film 11 comprises a transparent plastic material. The carrier film thus comprises for example a biaxially stretched polyester film which is between 6 μm and 50 μm in thickness. An array of microlenses 13 is shaped in the surface of the carrier film 11 in regions 22. The regions 22 alternate with regions 21 insofar as the surface of the carrier film 11 is shaped as a substantially flat 'mirror-form' surface. For that purpose the microlenses 13 are shaped in the regions 22 for example by means of a stamping tool with the use of heat and pressure or by means of UV replication while the flat surfaces are provided in the adjacent regions 21 by means of the stamping tool. For that purpose for example the procedure involves the use of a heated stamping roller which shapes the surface structure illustrated in FIG. 1 into the carrier film 11.

Furthermore it is also possible for a thermoplastic lacquer to be applied to the carrier film 11 and for the above-described surface structure to be shaped in that thermoplastic lacquer layer by means of the stamping tool.

The microlenses 13 are preferably spherical microlenses of a microlens diameter of between 10 μm and 50 μm and a structure depth of between 2 μm and 30 μm. The focal length of the microlenses 13 is in this case preferably so selected that the focal length approximately corresponds to the thickness of the carrier film.

Furthermore it is also possible to use cylindrical lenses instead of spherical microlenses. The axis of symmetry of the cylindrical lenses is in this case preferably arranged at a right angle to the longitudinal axis of the security element. Instead of refractively acting lenses it is also possible for diffractively acting lenses to be shaped in the surface of the multi-layer body 10, for the microlenses 13.

In addition it is also possible that, instead of microlenses, an arrangement comprising structure elements in polyhedron form, structure elements which can be detected by tactile means, a light-absorbent surface structure provided with a metallic layer, a matt structure or a diffractive surface structure is shaped in the regions 22, as has already been discussed hereinbefore.

The one-layer or multi-layer decorative layer 12 is now applied to the surface of the carrier film 11, which is opposite to the microlens arrays. In the simplest case the decorative layer 12 comprises a lacquer layer which is applied in pattern form to the carrier film 11 for example by means of intaglio printing. In the case shown in FIG. 1 the decorative layer 11 comprises a layer consisting of a (colored) photopolymer which is structured in pattern form in the form of a plurality of microimages 17 in the regions 22 by means of a photolithography process.

It is however also possible for the decorative layer 12 to comprise a plurality of differently colored lacquer layers which are so structured that they form multi-colored microimages in the regions 22. In addition the decorative layer 12 can also have one or more metal layers, replication lacquer layers, a layer forming a thin-film layer system, liquid crystal layers and/or layers with optically variable pigments.

In the regions 22 those layers are structured in such a way that the microimages 13 appear in those regions. In that respect, optically effective surface reliefs, for example optical-diffraction surface reliefs generating a hologram or a Kinegram®, are preferably shaped into a replication lacquer layer of the decorative layer 12 in the regions 21. Furthermore it is also possible for refractively acting surface reliefs, blaze gratings or matt structures to be shaped as the surface relief. The one or more metal layers of the decorative layer 12 are preferably demetallised in pattern form in the regions 22 so that only the image regions of the microimages or the background regions of the microimages are backed with a metal layer.

The term thin film layer systems is used to denote single-layer, dual-layer or multi-layer systems which have one or more spacer layers which satisfy the λ/2 or λ/4-condition in the range of visible light and which by virtue of interference exhibit a color shift effect which is dependent on the viewing angle. Systems of that kind can for example comprise an even or odd number of a plurality of dielectric HRI- and LRI-layers which differ in their refractive index (for example $SiO_2$, $ZrO_2$, ZnS, $MgF_2$; HRI=high refraction index; LRI=low refraction index) or also a succession of metallic (Al, Ag, Ni, Cr, Fe) and dielectric layers.

Preferably the liquid crystal layers used are cross-linked cholesteric liquid crystal layers which also present a color shift effect dependent on the viewing angle. It is also possible to use differently oriented, cross-linked nematic liquid crystal layers which can provide security features which can be recognised by means of a polarisation filter in the regions 21 but also in the regions 22.

The adhesive layers 14 and 15 are then applied to the multi-layer body 10.

The adhesive layers 14 and 15 are preferably hot melt adhesive layers which are applied to the multi-layer body 10 by means of a printing process. In that respect the adhesive layer 15 is preferably of a thickness of between 1 μm and 5 μm and the adhesive layer 14 is of a thickness of between 1 μm and 20 μm so that the microlenses are completely embedded in the adhesive layer. The adhesive used for the adhesive layers 14 is in that respect for example of the following composition.

The use of adhesives based on aqueous dispersions is advantageous for anchoring the security thread in carrier bodies of cotton and/or cellulose fibers. Preferably the adhesives 14 and 15 are based on combinations of aqueous polyacrylic acid ester, polyvinyl acetate and polyurethane dispersions. The properties in regard to printing and further processing are respectively adjusted as required by suitable additives such as coalescence and flow agents, anti-foam agents, fillers, pigments and rheology, surface, wetting and dispersing additives.

For incorporating the thread during paper manufacture it is advantageous for the adhesive 14 to be adjusted to be as transparent as possible and for the adhesive 15 to be adjusted to be white (with pigments such as $TiO_2$) in order better to be able to detect twisting of the thread between the film unwinding device and the round screen, and correct it in situ. Transparency of the adhesive 14 is also advantageous in terms of visibility of the regions 21 and 23 respectively if they come to lie in the regions 52 and 62 respectively of the carrier body, where they are not covered by paper fibers. Thus for example the adhesive layer 15 is firstly applied over the full area on the multi-layer body 10 by means of an intaglio printing process. The adhesive layer 15 is then dried and then optionally provided with a protective film. The adhesive layer 13 is then applied in the regions 21 by means of an intaglio printing process or by means of an ink jet printing process and subsequently dried in the drying passage. In that case the adhesive layer 14 is applied by printing to the carrier film 11 in register relationship with the decorative layer 12 and in register relationship with the surface relief formed on the surface of the carrier film 11. This means that both manufacture of the decorative layer 12, shaping of the surface relief in the carrier film 11 and also the operation of applying the adhesive layer 14 to the carrier film 11 by printing are effected by processes in mutually registered relationship.

Instead of thermally activatable adhesives it is also possible to use adhesive layers which can be activated by UV or pressure, but also water-soluble adhesives, for the adhesive layers 14 and 15. In that respect, different adhesives can also be used for the adhesive layers 14 and 15. Preferably, when using adhesives of that kind, a protective film provided with a release layer is applied both to the adhesive layer 14 and also to the adhesive layer 15 in order in that way to be able to carry out the operation of winding up the film strip in the production process without activation of the adhesive layers 14 and 15.

Preferably the microimages 17 are arranged in a regular one-dimensional or two-dimensional microimage grid raster extending over the individual regions 22 and the microlenses 13 are also arranged in a one-dimensional or two-dimensional microlens structure extending over the regions 22. Another arrangement, for example in the manner of a pattern generating a moiré is also possible. The microimage raster grids and the microlens raster grids preferably differ slightly in their raster grid spacing or in their angular position, relative to each other. Furthermore it is also possible for the microimage raster grid and the microlens raster grid not to be oriented in register relationship with each other, for example for them to be positioned with a deviation of +/−0.5 mm relative to each other. The microimages preferably involve identical microimages which for example represent a symbol, for example a star or a currency symbol. It is however also possible for different microimages to be preferably provided in a repetitive pattern in the regions 22. In addition it is also possible for the focal length of the microlenses to differ in region-wise manner. By way of example, in a first region of the security element, which embraces a plurality of regions 22, the microlenses 13 are provided in accordance with a first raster grid and with a first focal length. In a second region which also extends over a plurality of regions 22 or partial regions of a plurality of regions 22, the microlenses 13 are provided in accordance with a second microlens raster grid with a second focal length or a second lens diameter, wherein the first and second raster grids differ in raster grid spacings and the first and second focal lengths or lens diameters differ.

Figure 2:
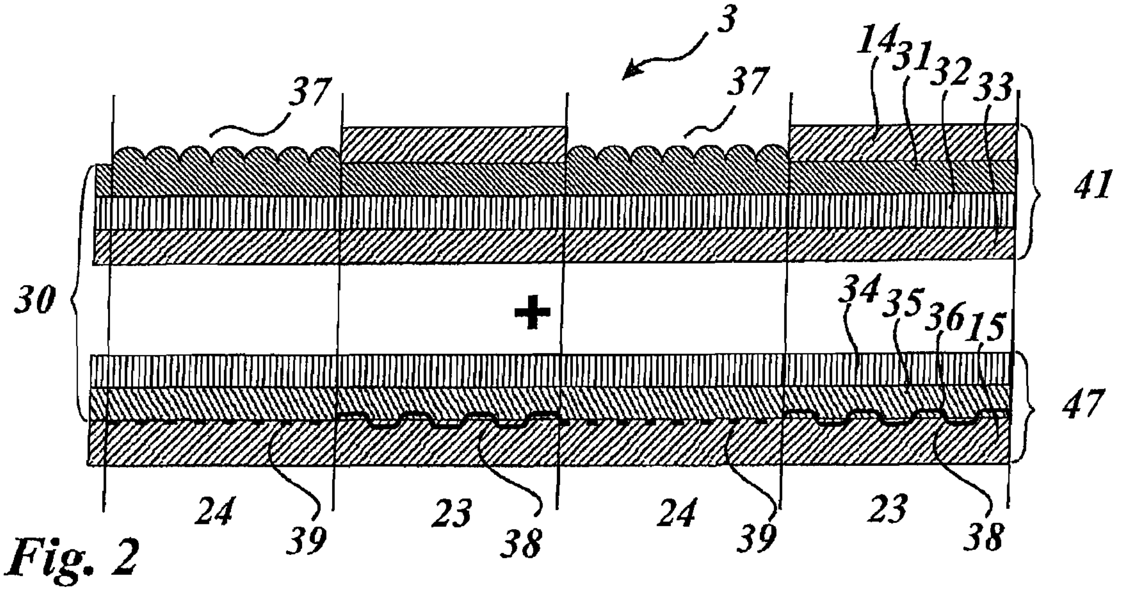
FIG. 2 shows a view in section of a security element according to the invention, in accordance with a further embodiment of the invention.

FIG. 2 shows a further embodiment of a security element according to the invention. FIG. 2 shows the security element 3 which comprises a multi-layer body 30 and the adhesive layers 14 and 15 arranged on the top side and the underside respectively of the multi-layer body 30.

The multi-layer body 30 is in this case produced from two semifinished products:

On the one hand, a transparent polyester carrier 32 is coated with a UV replication lacquer and then in regions 24 an array of microlenses 37 is respectively formed by means of UV replication in the lacquer layer 31 formed by the replication lacquer. In that arrangement the regions 24 alternate with regions 23 in which no microlenses are shaped in the lacquer layer 31. The lacquer layer 31 is then printed upon with the adhesive layer 14 in the regions 23, in a registered printing process. After drying of the adhesive layer 14 an adhesive layer 33 is applied over the full surface area to the surface of the polyester carrier 32, which is opposite to the lacquer layer 31. Thus, in production of this multi-layer body, the multi-layer body 41, the operation of shaping the microlens arrays in the replication lacquer layer 31 and the operation of applying the partial adhesive layer 14 by printing are effected in processes in mutually registered relationship.

In a process which is carried out in parallel therewith, a replication lacquer layer 35 is applied to a polyester carrier 34 and then a first surface structure is shaped in the regions 24 and a second surface structure 38 is shaped in the regions 23. The first and second surface structures can involve for example different optical-diffraction structures. Furthermore, in a further production process, the surface structure shaped in the regions 24 can be used for structuring one or more further layers which in the regions 24 respectively form one or more microimages 39. The lacquer layer 35 is for example a thermoplastic lacquer or a UV lacquer in which the first and second surface structures are shaped in the regions 23 and 24 by means of a suitably shaped replication tool. A metal layer 36 is then applied to the lacquer layer 35 over the full area and subsequently partially demetallised in the regions 24 so that the metal layer 36 is structured in the regions 24 in the form of the microimages 39. For that purpose the metal layer 36 can be removed either in the background regions or also in the image regions of the microimages 39, by means of a demetallisation process. Partial demetallisation of the metal layer 36 can be effected for example using a photolithographic process or by means of applying a positive/negative resist by printing, by means of partially applying an etching agent by printing and/or by means of ablation, for example laser ablation. In that respect demetallisation of the metal layer 36 has to be effected in register relationship with the shaping of the surface relief in the replication lacquer layer 35.

The adhesive layer 15 is then applied to the metal layer 36 over the full surface area involved and dried. That affords the multi-layer body 47.

In a further production step the multi-layer body 41 is then laminated on to the multi-layer body 47. For that purpose the adhesive layer 33 of the multi-layer body 41 is brought into contact with the carrier film 34 of the multi-layer body 47 and then the adhesive of the adhesive layer 33 is activated for example by heat, pressure or UV radiation, depending on the respective type of adhesive which is being used. In that respect, the operation of laminating the multi-layer body 41 on to the multi-layer body 47 has to be effected in accurate register relationship so that the regions 24 and 23 of the multi-layer body 47 and the identical regions of the multi-layer body 41 are disposed in coincident overlapping relationship.

Figure 3A:
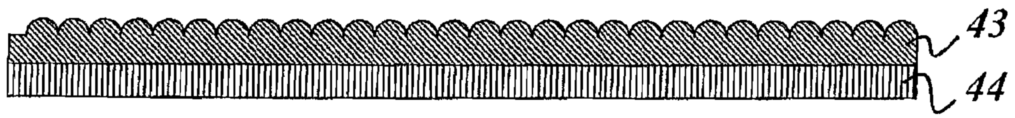
FIGS. 3*a* and 3*b* show views illustrating a partial section in the production of a security element according to the invention.
Figure 3B:
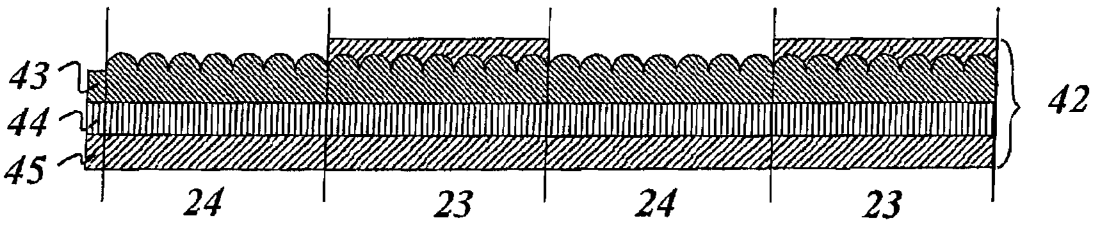

An alternative manufacturing process for the production of the multi-layer body 41 will now be described with reference to FIGS. 3*a* and 3*b*.

In a first step a UV-hardenable replication lacquer layer 43 is applied to a carrier film 44, for example a biaxially stretched PET or BOPP film of a thickness of 27 μm. A surface structure in the form of a transmissive microlens array is then shaped in the replication lacquer layer 43 over the entire area involved, using a replication tool. That procedure involves using for example a replication roller which is transmissive for UV light so that, besides mechanical shaping of the surface structure in the replication lacquer which is still soft, at the same time hardening and thus fixing of the surface structure is also effected by the replication roller. An adhesive layer 45 is then applied to the carrier film 44 over the entire area and the adhesive layer 14 is applied by printing to the surface of the replication lacquer layer 43 in a predetermined repetitive pattern so that the adhesive layer 14 covers the replication lacquer layer 43 in the regions 23 and does not cover the replication lacquer layer 43 in the regions 24. The surface structure shaped into the surface of the replication lacquer layer 43 is filled by the adhesive of the adhesive layer 14 in the regions 23 and thus the optical effect thereof is extinguished or considerably attenuated so that the regions 23 of the multi-layer body 42 optically act substantially as a mirror surface.

The multi-layer body 42 is then laminated instead of the multi-layer body 41 on to the multi-layer body 47.

Figure 4A:
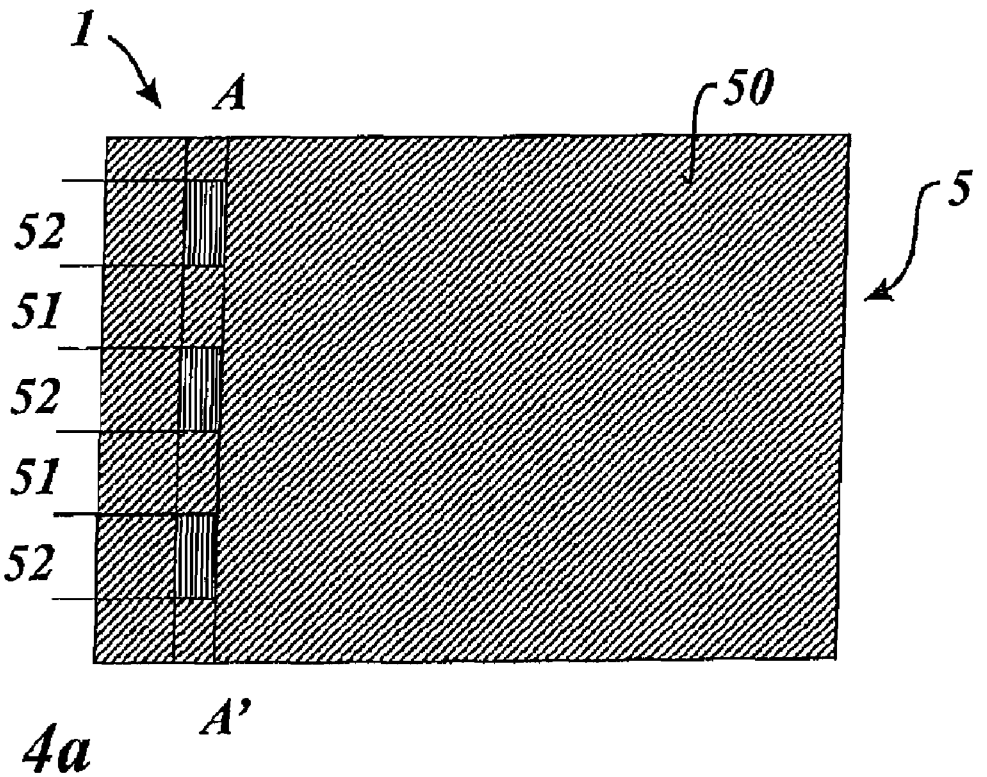
FIG. 4*a* shows a plan view of a value-bearing document according to the invention.
Figure 4B:
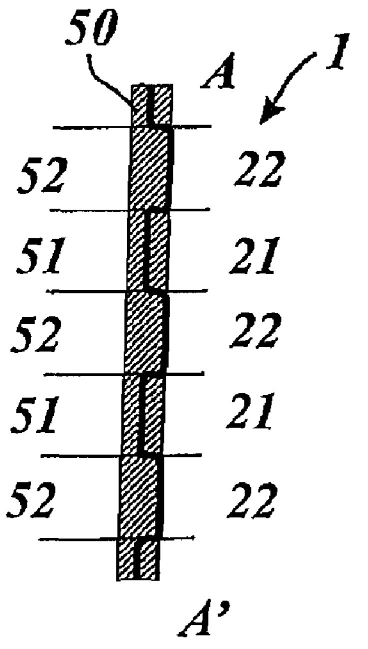
FIG. 4*b* shows a sectional view of the value-bearing document of FIG. 4*a*.

FIGS. 4*a* and 4*b* show a first possible way of binding in a security element as shown in FIGS. 1 and 2 in a value-bearing document.

FIG. 4*a* shows a plan view of a value-bearing document 5 and FIG. 4*b* shows a sectional view of the value-bearing document 5 along a section line A-A'. The document 5 is preferably a banknote. It is however also possible that the value-bearing document 5 is any other value-bearing document or part of any other value-bearing document, for example a pass or passport, an access or admittance document, a ticket, a visa and so forth. The value-bearing document 5 has a carrier body 50. The carrier body 50 preferably comprises a paper material in sheet form which is provided with one or more printing layers on both sides. In addition it is also possible for one or more further security features to be applied to the carrier body 50 or for further security features to have been introduced into the carrier body 50 in production of the paper, for example it is possible for one or more watermarks to be provided in the carrier body 50. The security element 1 is now introduced into the carrier body 50 in the region of the section line A-A. That is preferably effected during manufacture of the paper. In that respect the security element 1 is introduced into the paper material while still moist in the manner shown in FIG. 4*b*, that is to say the security element 1 is arranged in the region 52 of the carrier body 50 on the surface of the carrier body 50 and is enclosed by paper layers on both sides in the region 51 of the carrier body 50.

For that purpose the security element 1 is preferably pre-shaped in the form shown in FIG. 4*b*, then the (optional) protective layers are pulled off the adhesive layer 14 and/or 15 and then the security element 1 is introduced through a nozzle at the corresponding location into the paper material which is still moist. After drying of the paper material the adhesive layers 14 and 15 are activated by heat, pressure or UV radiation, depending on the respective adhesive used, and thus the multi-layer body 10 is fixed in the carrier body 50.

Furthermore it is also possible for the security element 1 not to be of the three-dimensional form shown in FIG. 4*b*, but for the thickness of the carrier body to be reduced in the regions 52 for example by means of a suitably shaped watermark so that in the regions 52 the surface of the security element 1 which is inserted flat into the paper material is exposed while in the regions 51 it is covered by paper material on both sides. Furthermore it is also possible for the security element 1 not to be introduced during the manufacture of the paper but in a subsequent production process, for example by a procedure whereby suitable openings are produced in the paper body by ablative processes or stamping in order to introduce the security element into the carrier body 50 in such a way that the surface with the microlenses 13 is not covered by paper material in the regions 52 and that surface of the multi-layer body 10 is covered by paper material in the regions 51.

In addition it is also possible that the security thread is introduced between two prefabricated paper layers or also layers of another carrier material, for example a colored and/or printed-upon plastic film or a combination of plastic film and paper layers which are then joined together by means of a laminating process. Thus it is possible for example for the security element to be applied to a first carrier layer and for a second carrier layer then to be laminated on to the first carrier layer, wherein the second carrier layer has in the regions 52 corresponding openings through which the surface of the multi-layer body 10 is visible.

In the above-described procedure the security element 1 is introduced into the carrier body 50 in register relationship with the regions 51 and 52 of the carrier body 50, that is to say the security element 1 is oriented with respect to the regions 51 and 52 in such a way that the regions 22 are in coincident overlapping relationship with the regions 52 and the regions 21 with the regions 51. For that purpose it is necessary for the security element 1 to be introduced into the carrier body 50 in registered relationship.

Figure 5A:
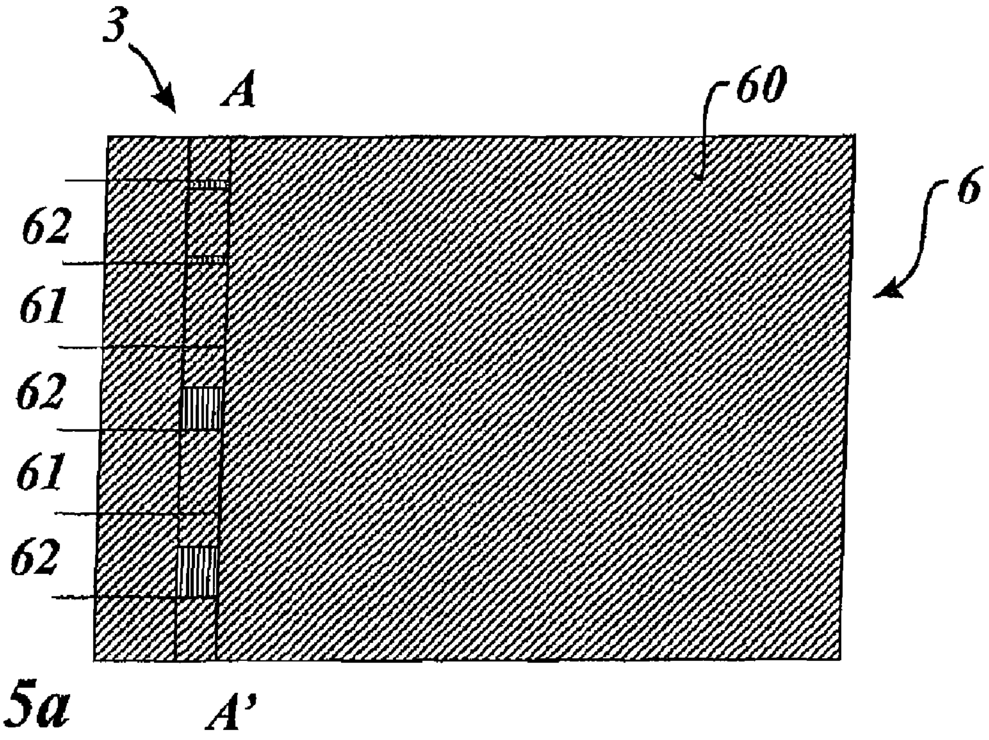
FIG. 5*a* shows a plan view of a value-bearing document according to the invention, in accordance with a further embodiment of the invention.
Figure 5B:
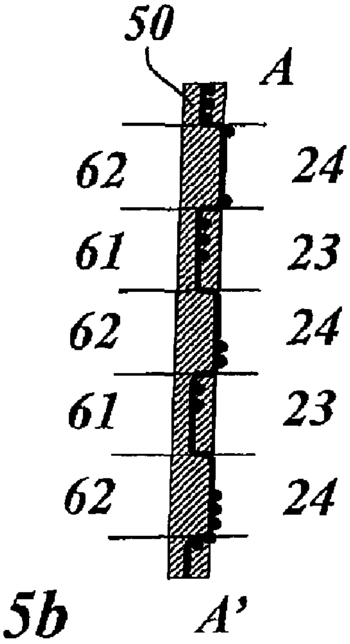
FIG. 5*b* shows a sectional view of the value-bearing document of FIG. 5*a*.

Reference will now be made to FIGS. 5*a* and 5*b* to show a further possible way in which the security element can also be introduced into the carrier body of the value-bearing document in a non-registered process.

FIG. 5*a* shows a plan view of a value-bearing document 6 comprising a carrier body 60 and the security element 3 which is introduced into the carrier body 60. FIG. 5*b* shows a view in section of the value-bearing document 6 at the section line A-A' in FIG. 5*a*.

As already clearly illustrated by reference to FIGS. 5*a* and 5*b*, the security element 3 is surrounded on both sides by the material of the carrier body 60 in the regions 61 thereof. In the regions 62 the security element 3 is at the surface of the carrier body 60, that is to say in those regions only one side of the security element 3 is covered by the carrier body 60.

The regions 23 and 24 of the security element 3 are arranged in a periodic succession. In this case the regions 23 and 24 respectively occupy the entire width of the security element 3 which is in the range of between 2 mm and 10 mm. The extent of the regions 23 and 24 in the longitudinal direction of the security element 3 is between 300 μm and 10 mm, preferably between 2 mm and 5 mm. The extent of the regions 23 and 24 can be selected to be the same in order to ensure secure anchoring of the security element 3.

In that respect it is further advantageous if the extent of the regions 23 in the longitudinal direction of the security element 3 is less than 50% of the extent of the regions 24 in the longitudinal direction of the security element 3.

The regions 61 and 62 are approximately of a width corresponding to that of the security element 3. Preferably the regions 61 and 62 involve the same extent in the longitudinal direction of the section line A-A', which is preferably in the range of between 2 mm and 10 mm. It is however also possible for the extent of the regions 61 and 62 to differ, for example it is possible for the longitudinal extent of the regions 62 to be 50% of the longitudinal extent of the regions 61.

In the embodiment of the invention which is illustrated with reference to FIGS. 5*a* and 5*b* the regions 61 and 62 are also arranged in a periodic succession, wherein the period of the succession of the regions 24 and 23 of the security element 3 is smaller than that of the succession of the regions 61 and 62. That ensures that, in each of the regions 61, at least one (partial) region 23 is disposed in coincident overlapping relationship and thus the security element 3 is glued to the carrier body 60 by means of the adhesive layer 14 in each of the regions 61. Furthermore, in the case of a non-periodic succession of the regions 24 and 23 and/or 61 and 62 it is possible also to ensure this, if the minimum of the spacings of successive regions 24 is less than that of the spacings of successive regions 64.

Preferably in that case the period of the succession of the regions 23 and 24 is markedly less than the period of the succession of the regions 61 and 62, for example the period of the succession of the regions 23 and 24 is less than 50% of the period of the succession of the regions 61 and 62. That provides on the one hand for particularly secure adhesive connection of the security element 3 to the carrier body 60. Furthermore, in that fashion, in the regions 62, a succession of two security elements is respectively visible, more specifically a succession of the security element represented by the regions 22 and a succession of the security element represented by the regions 21, thereby affording optically variable effects which are of interest.

As is already the case with the embodiment of FIGS. 5*a* and 5*b* in which the period of the two successions is only slightly varied, optically variable effects which are of interest are afforded: as indicated in FIGS. 5*a* and 5*b*, in the regions 62 there are respectively regions 23 and 24 involving a different arrangement and longitudinal extent so that different security features already optically appear in those regions.

A further embodiment of the invention will now be described with reference to FIGS. 6*a* and 6*b:*

Figure 6A:
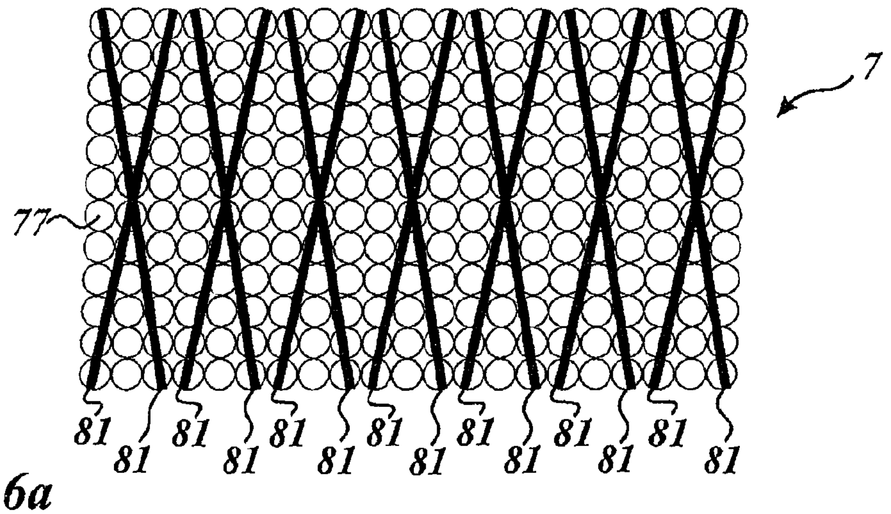
FIG. 6*a* shows a diagrammatic view of a partial region of a security element according to the invention, in accordance with a further embodiment thereof.
Figure 6B:
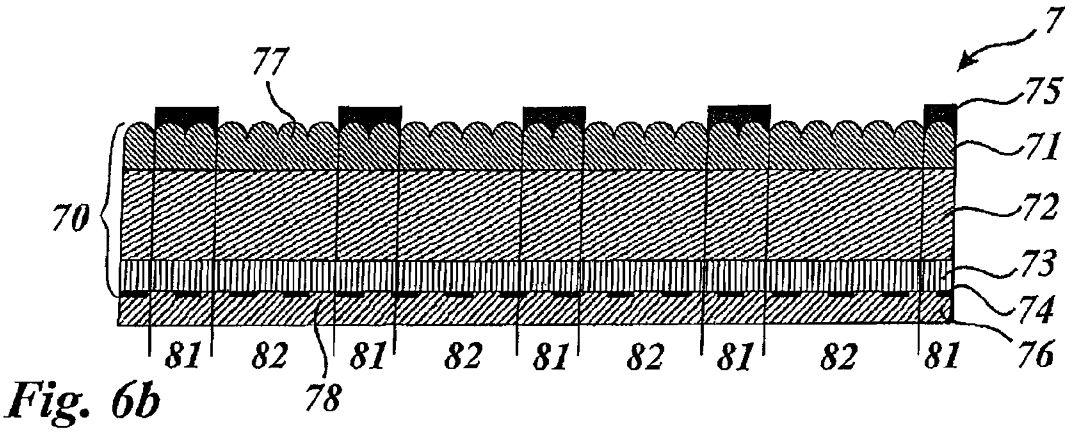
FIG. 6*b* shows a view in section of the security element of FIG. 6*a*.

FIG. 6*b* shows a cross-section of a security element 7 which comprises a multi-layer body 70 and a partial adhesive layer 75 applied to the top side of the multi-layer body 70 and a second adhesive layer 76 applied over the full surface area to the underside of the multi-layer body 70. The multi-layer body 70 comprises a replication lacquer layer 21 into which a microlens array is introduced over the full surface area involved by means of the above-discussed UV replication process. The replication lacquer layer 41 is followed by a carrier film 72, for example a polyester film of a thickness of between 6 μm and 50 μm. That is followed by a replication lacquer layer 73 which is between about 0.5 μm and 2 μm in thickness and in which an optical-diffraction surface relief is shaped. There then follows a partial metal layer 74 which is structured in the form of a plurality of microimages.

In addition it is also possible for one or more of the decorative layers described with reference to FIG. 1 to be provided in place of the layers 73 and 74. Now, in the regions 81, the multi-layer body 70 has the adhesive layer 75 applied thereto by printing in the manner diagrammatically shown in FIG. 6*a*. The adhesive layer 75 is not provided in the regions 82 therebetween. The regions 61 are formed in this case by strip-form, partially overlapping regions, the width of which is less than 300 μm. The width of the regions 81 is thus below the resolution of the human eye so that—if the width of the regions 82 is selected to be sufficiently great—the deactivation of microlenses, which is caused by the adhesive layer 75 in the regions 81, does not substantially alter the resulting overall impression. The width of the regions 82 at the respectively widest locations is preferably several mm. Instead of the arrangement of regions 81 shown in FIG. 6*a*, it will be appreciated that it is also possible to adopt a different arrangement, for example an arrangement with step-form regions extending in mutually parallel relationship, a two-dimensional dot raster or a two-dimensional raster with logos.

It is also possible in the embodiment shown in FIGS. 6*a* and 6*b* to provide different optical elements in the regions 81 and 82 of the decorative layer so that, for example in the case of the adhesive layer 75 not being applied in accurate register relationship, that immediately becomes apparent and forgeries can be very easily detected.

Figure 7:
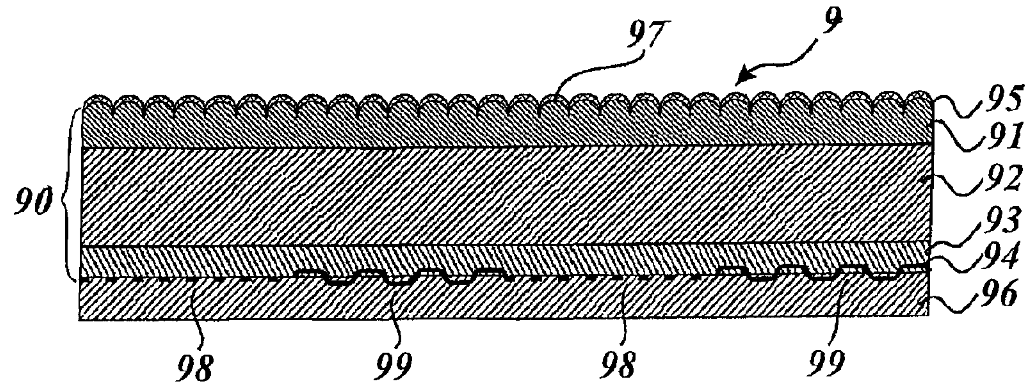
FIG. 7 shows a view in section of a security element according to the invention, in accordance with a further embodiment thereof.

FIG. 7 shows a security element 9 having a multi-layer body 90, a first adhesive layer 95 and a second adhesive layer 96. The multi-layer body 90 comprises a carrier film 92, a replication lacquer layer 91 with a surface structure which is shaped into the surface of the replication lacquer layer 91 and a decorative layer which includes a replication lacquer layer 93 and a partial metal layer 94. In this case, the carrier film 92 and the decorative layer are constructed like the carrier film 11 and the decorative layer 12 shown in FIG. 1 and alternately have regions in which microimages 98 are provided in the decorative layer and in which an optically active surface relief 99, for example a hologram or a Kinegram® is shaped and provided with a reflection layer.

The structure elements 97 of the surface structure are shaped in the surface of the multi-layer body 90 in a regular, one-dimensional or two-dimensional arrangement, as has been described by way of example hereinbefore with reference to FIG. 2 in relation to the lacquer layer 31.

The surface structure which is shaped into the replication lacquer layer 93 in the first surface can be one of the above-described surface structures. Preferably this involves a surface structure which has structure elements of a smallest dimension of less than 30 μm, in particularly of less than 20 μm, and/or a structure depth of ≦5 μm. Preferably the surface structure is one or a combination of the surface structures described hereinafter:

This can be a diffractive structure, for example a hologram, a sinusoidal diffraction grating, a cross grating or a blaze grating, which involves a structure depth of between 50 nm and 750 nm and a period or spacing of the structure elements of between 0.5 and 5 μm. In addition the surface structure may also involve a refractively acting structure, for example a Fresnel lens or another achromatic, in particular asymmetrical surface structure which involves a spacing in respect of the structure elements or a period of between 1 μm and 20 μm and a depth of between 0.5 and 5 μm. It can also involve a mesa structure which is shaped in the form of a nanotext and for example has plateau-form raised portions or recesses which are shaped in the form of an image or a piece of text and the maximum lateral dimension of which is less than 75 μm and the minimum dimension or size of which is greater than 1 μm, wherein the structure depth, that is to say the height and depth of the raised portion and recess respectively, is between 100 nm and 5 μm with respect to the surrounding surface.

Furthermore it is also possible for the surface structure which is shaped in the surface of the replication lacquer layer 91 to be formed by a combination of such structures.

In the embodiment illustrated in FIG. 7 the structure elements 97 are formed by microlenses with a structure depth of between 2 μm and 30 μm and a microlens diameter of between 10 μm and 50 μm. In the simplest case the microlenses are in the form of cylindrical microlenses or spherical microlenses. In place of microlenses, as described hereinbefore, it is also possible for polyhedric structure elements to be shaped as the structure elements in the surface of the multi-layer body 90.

The adhesive layer 95 preferably comprises a hot melt adhesive layer of a thickness of between 1 μm and 5 μm, which is applied to the underside of the multi-layer body 90 over the entire area thereof by means for example of an intaglio printing process.

The adhesive layer 95 is a very thin adhesive layer which, as shown in FIG. 7, is selected to be so thin that it does not fill the structure elements 97 of the surface structures shaped in the surface of the multi-layer body 90, but assumes same as a surface relief.

For that purpose the adhesive layer 95 is applied to the replication lacquer layer 91 in a layer thickness which is less than 50% of the structure depth of the structure elements 97 of the surface structure shaped in the replication lacquer layer 91, preferably being between 10 and 30% and in particular between 5% and 20% of the structure depth of those structure elements.

Preferably the adhesive layer 95 is applied to the surface of the multi-layer body 90 in dot-wise fashion, for example by means of an ink jet printer. That provides that the adhesive layer 95 begins to dry more quickly, thereby preventing ‘flow’ of the adhesive layer and filling, caused thereby, of recesses in the surface structure.

In addition it is possible for the adhesive layer 95 to be formed by a plurality of thin adhesive layers which are respectively applied to the multi-layer body 90, then dried and subsequently printed upon with a further adhesive layer in order in that way to avoid the recesses in the surface structure becoming filled.

The adhesive used for the adhesive layer 95 is preferably an adhesive based on aqueous dispersions. Preferably that adhesive is based on combinations of aqueous polyacrylic acid ester, polyvinyl acetate and polyurethane dispersions.

As already described with reference to the adhesive layers 14 and 15 of FIG. 1 the adhesive layers 95 and 96 can be adhesive layers which are activatable by means of UV or pressure, but they may also be water-soluble adhesives.

Figure 8:
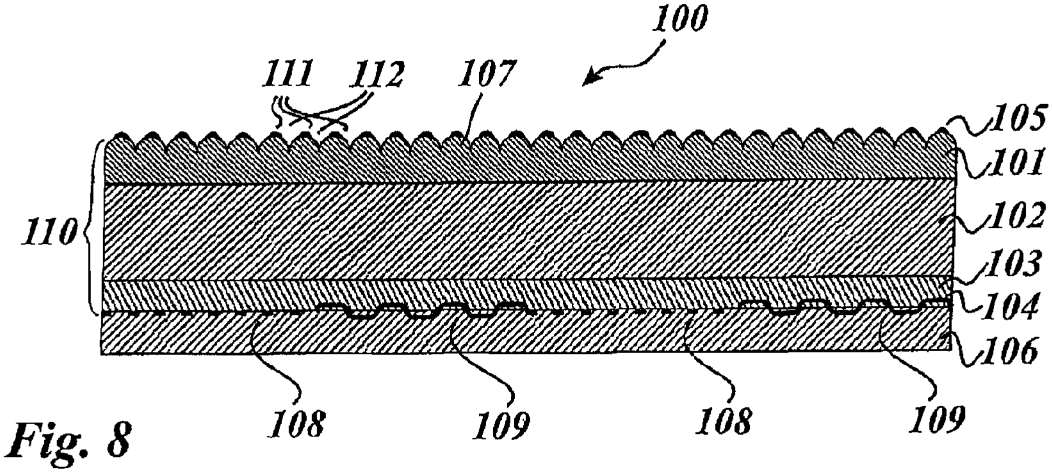
FIG. 8 shows a view in section of a security element in accordance with a further embodiment of the invention.

FIG. 8 shows a security element 100 with a multi-layer body 110, a first adhesive layer 105 and a second adhesive layer 106.

The multi-layer body 110 is constructed like the multi-layer body 90 of FIG. 7 and comprises a replication lacquer layer 101, a carrier film 102, a replication lacquer layer 103 and a decorative layer 104 which alternately forms regions with microimages 108 and an optically effective surface structure 109.

The adhesive 106 is like the adhesive layer 96 or the adhesive layer 15 of FIG. 7 and FIG. 1 respectively.

The adhesive layer 105 is respectively applied only in region-wise manner to the structure elements 107 shaped in the surface of the multi-layer body 110. As shown by way of example in FIG. 8 the adhesive layer 105 is thus applied in regions 111 to the surface of the multi-layer body 110 and not applied in regions 112 to the surface of the multi-layer body 110, wherein the regions 111 and 112 alternately and depending on the respective choice of the arrangement of the structure elements 107 form a repetitive periodic pattern.

The regions 111 in which the adhesive layer 105 is provided on the surface of the multi-layer body 110 represent regions which surround a respective local maximum of the structure elements 107. Thus for example if a microlens array is shaped in the surface of the multi-layer body 110, the regions 111 represent regions which surround the respective optical axes of the microlenses. In that case the regions 111 preferably occupy not more than 30% of the surface region occupied by the respective structure element so that, if each of the structure elements 107 has a region 111, that affords a ratio of the total surface area of the regions 111 to that of the regions 112 of between 30 and 70. Furthermore it is also possible that not each one of the structure elements 107 has a region 111, thus for example structure elements are provided, the maxima of which are not covered with the adhesive layer 105.

In this respect, as in the embodiment of FIG. 7, the adhesive layer 105 is applied in a layer thickness of not more than 50% of the structure depth of the structure elements 107, preferably by means of an ink jet printing process.

The invention claimed is:

1. A security element for safeguarding value-bearing documents, wherein the security element includes a strip-form multi-layer body with a carrier film and at least one decorative layer as well as a first and a second adhesive layer, wherein the first adhesive layer is provided on a first surface of the multi-layer body and the second adhesive layer is provided on an oppositely disposed second surface of the multi-layer body, wherein the security element has two or more first regions in which the first adhesive layer respectively covers the first surface of the multi-layer body and two or more second regions in which the second adhesive layer covers the second surface but in which the first surface of the multi-layer body is not covered by the first adhesive layer respectively and in which a surface structure is respectively shaped in the first surface, and wherein the first and second regions are periodically repetitively arranged in mutually juxtaposed relationship in a regular, one-dimensional or two-dimensional raster grid.

2. A security element as set forth in claim 1, wherein, in the two or more first regions the second adhesive layer respectively covers the second surface of the security element.

3. A security element as set forth in claim 1, wherein the first and second regions are arranged alternately in juxtaposed relationship in the longitudinal direction of the strip-form multi-layer body.

4. A security element as set forth in claim 1, wherein the second regions have a length of more than 300 μm.

5. A security element as set forth in claim 1, wherein the first regions are of a constant width and occupy the entire width of the multi-layer body.

6. A security element as set forth in claim 1, wherein the first regions are of an extent in the longitudinal direction of the strip-form multi-layer body of between 0.5 mm and 5 mm and the second regions are of an extent in the longitudinal direction of the strip-form multi-layer body of between 2 mm and 15 mm.

7. A security element as set forth in claim 1, wherein the first regions are respectively of a largest dimension of more than 300 μm and a smallest dimension of less than 300 μm.

8. A security element as set forth in claim 1, wherein the first regions are shaped in a strip form of a width of less than 300 μm.

9. A security element as set forth in claim 1, wherein one or more microlenses are respectively shaped in the first surface as the surface structure in the second regions.

10. A security element as set forth in claim 9, wherein the microlenses are of a diameter of between 10 μm and 50 μm.

11. A security element as set forth in claim 9, wherein the decorative layer respectively has one or more microimages in each of the second regions.

12. A security element as set forth in claim 11, wherein the microimages and the microlenses in the second regions are arranged in a regular microlens raster grid or microimage raster grid, wherein the raster spacings of the microimage raster grid and the microlens raster grid differ from each other by less than 10%.

13. A security element as set forth in claim 1, wherein one or more microprisms, are respectively shaped in the first surface as the surface structure in the second regions.

14. A security element as set forth in claim 1, wherein one or more structure elements which can be detected by tactile means are respectively shaped in the first surface as the surface structure in each of the second regions.

15. A security element as set forth in claim 1, wherein matt structures are shaped in the first surface as the surface structure in the second regions.

16. A security element as set forth in claim 1, wherein a diffractive structure is shaped in the first surface as the surface structure in the second regions.

17. A security element as set forth in claim 1, wherein a cross grating with periods below the wavelength of the light visible to the human viewer is shaped in the first surface as the surface structure in the second regions.

18. A security element as set forth in claim 1, wherein the decorative layer has a metallic reflection layer.

19. A security element as set forth in claim 1, wherein the decorative layer has a diffractive surface relief.

20. A security element as set forth in claim 1, wherein the decorative layer has a thin film layer system, an oriented liquid crystal layer or a layer with optically variable pigments.

21. A security element as set forth in claim 1, wherein the decorative layer is structured in pattern form in the form of a plurality of microimages in the second regions.

22. A security element as set forth in claim 1, wherein the decorative layer is of differing configurations in the first and second regions and in the second regions respectively has one or more microimages and in the first regions respectively has an optically variable element.

23. A security element as set forth in claim 1, wherein the first regions form a first security feature and the second regions form a second security feature different therefrom.

24. A security element as set forth in claim 1, wherein the width of the multi-layer body is between 2 mm and 10 mm.

25. A security element for safeguarding value-bearing documents, wherein the security element has a strip-form multi-layer body with a carrier film and at least one decorative layer as well as a first and a second adhesive layer, wherein the first adhesive layer is provided on a first surface of the multi-layer body and the second adhesive layer is provided on an oppositely disposed second surface of the multi-layer body, wherein a surface structure with a plurality of structure elements is shaped in the first surface in a replication lacquer layer and wherein at least in a region of the security element the first adhesive layer is applied to the surface structure in a layer thickness of less than 50% of the structure depth of the structure elements of the surface structure, and wherein one or more microlenses are respectively shaped in the first surface as the surface structure, and wherein the decorative layer has one or more microimages, and wherein the microimages and the microlenses in the second regions are arranged in a regular microlens raster grid or microimage raster grid, wherein the raster spacings of the microimage raster grid and the microlens raster grid differ from each other by less than 10%.

26. A value-bearing document comprising a carrier body and a security element as set forth in claim 1, wherein the multi-layer body is connected to the carrier body by means of the first and second adhesive layers.

27. A value-bearing document as set forth in claim 26, wherein the first surface of the multi-layer body is covered by the carrier body in two or more third regions of the security element and the second surface of the multi-layer body but not the first surface of the multi-layer body is covered by the carrier body in two or more fourth regions of the security element.

28. A value-bearing document as set forth in claim 27, wherein each third region is arranged in coincident overlapping relationship with at least one first region.

29. A value-bearing document as set forth in claim 28, wherein the third and first regions as well as the fourth and second regions are arranged in register relationship with each other.

30. A value-bearing document as set forth in claim 27, wherein the first and second regions are arranged in a periodic first succession, the third and fourth regions are arranged in a periodic second succession and the period of the first succession is less than that of the second succession.

31. A value bearing document comprising:

a paper carrier body having a top surface; and a security element embedded in said carrier body, said security element comprising a multi-layer body divided into first and second regions alternately arranged in adjacent mutually juxtaposed relationship, said multi-layer body comprising:

a carrier film having opposite first and second surfaces and one or more microlenses shaped in the first surface in the second region of the multi-layer body;

at least one decorative layer disposed on said second surface of said carrier film, said decorative layer having one or more microimages disposed in said second region of said multi-layer body, wherein the microimages and the microlenses in the second region are arranged in a regular microlens raster grid or microimage raster grid, and wherein the raster spacings of the microimage raster grid and the microlens raster grid differ from each other by less than 10%;

a first adhesive layer disposed on said first surface of said carrier film in said first regions of said multi-layer body, but not in said second regions of said multi-layer body; and a second adhesive layer disposed over said decorative layer on said second surface of said carrier film in both said first and second regions of said multi-layer body, wherein the multi-layer body is connected to the paper carrier body by means of the first and second adhesive layers whereby a plurality of first portions of the multi-layer body are disposed flush with said top surface of said carrier body and a plurality of second portions of the multi-layer body are enclosed on opposite sides by paper of the carrier body, each of said first portions of the multi-layer body coinciding with at least a portion of said second region of the mutli-layer body having said microlenses.

* * * * *